(12) United States Patent
Meissner et al.

(10) Patent No.: US 9,821,286 B2
(45) Date of Patent: Nov. 21, 2017

(54) TRANSPORTABLE REFORMER

(71) Applicant: THYSSENKRUPP INDUSTRIAL SOLUTIONS AG, Essen (DE)

(72) Inventors: Oliver Meissner, Gladbeck (DE); Falk Beyer, Dortmund (DE)

(73) Assignee: THYSSENKRUPP INDUSTRIAL SOLUTIONS AG, Essen (DE)

(*) Notice: Subject to any disclaimer, the term of this patent is extended or adjusted under 35 U.S.C. 154(b) by 19 days.

(21) Appl. No.: 14/365,487

(22) PCT Filed: Dec. 12, 2012

(86) PCT No.: PCT/EP2012/005118
§ 371 (c)(1),
(2) Date: Jun. 13, 2014

(87) PCT Pub. No.: WO2013/087194
PCT Pub. Date: Jun. 20, 2013

(65) Prior Publication Data
US 2014/0314631 A1   Oct. 23, 2014

(30) Foreign Application Priority Data
Dec. 14, 2011 (DE) .................. 10 2011 120 938

(51) Int. Cl.
*B01J 8/06* (2006.01)
*C01B 3/00* (2006.01)
*C01B 3/38* (2006.01)

(52) U.S. Cl.
CPC ............... *B01J 8/062* (2013.01); *C01B 3/384* (2013.01); *B01J 2219/0002* (2013.01); *C01B 2203/0233* (2013.01); *C01B 2203/0816* (2013.01)

(58) Field of Classification Search
CPC .................. B01J 8/062; C01B 3/384
See application file for complete search history.

(56) References Cited

U.S. PATENT DOCUMENTS 2,194,500 A    3/1940  Herthel et al.
7,837,974 B2 * 11/2010  Hederer .............. B01J 8/062
                                                 423/220

(Continued)

FOREIGN PATENT DOCUMENTS

DE    17 67 980 A1    3/1972
DE    103 33 854 A1   2/2005

(Continued)

OTHER PUBLICATIONS

German Language International Search Report for International PCT Patent Application No. PCT/EP2012/005118; dated Jun. 3, 2013.

(Continued)

*Primary Examiner* — Matthew J Merkling
(74) *Attorney, Agent, or Firm* — Thyssenkrupp North America, Inc.

(57) ABSTRACT

Disclosed is a transportable reformer for the catalytic primary reforming of hydrocarbons using steam at elevated pressure, comprising a reforming tube system, a furnace disposed about the reforming tube system, a plurality of manifolds in communication with the reformer tubes, a plurality of flue gas tunnels disposed beneath and in gaseous communication with the furnace, wherein each of the manifolds is integrally coupled to, disposed between, and supported by the opposing outer walls of an adjacent pair of flue gas tunnels such that the reformer is configured to be transportable as a single unit without additional support structures.

20 Claims, 2 Drawing Sheets

(56) References Cited

U.S. PATENT DOCUMENTS

2008/0290322 A1 11/2008 Hederer et al.
2010/0193741 A1 8/2010 Meissner et al.

FOREIGN PATENT DOCUMENTS

| DE | 102005021500 A1 | 11/2006 |
| DE | 102007019830 B3 | 7/2008 |
| EP | 1 329 256 A1 | 7/2003 |
| EP | 1 783 425 A1 | 5/2007 |
| GB | 1 196 654 A | 7/1970 |
| WO | 2010/149361 A2 | 12/2010 |

OTHER PUBLICATIONS

English translation of International Search Report for International PCT Patent Application No. PCT/EP2012/005118; dated Jun. 3, 2013.

\* cited by examiner

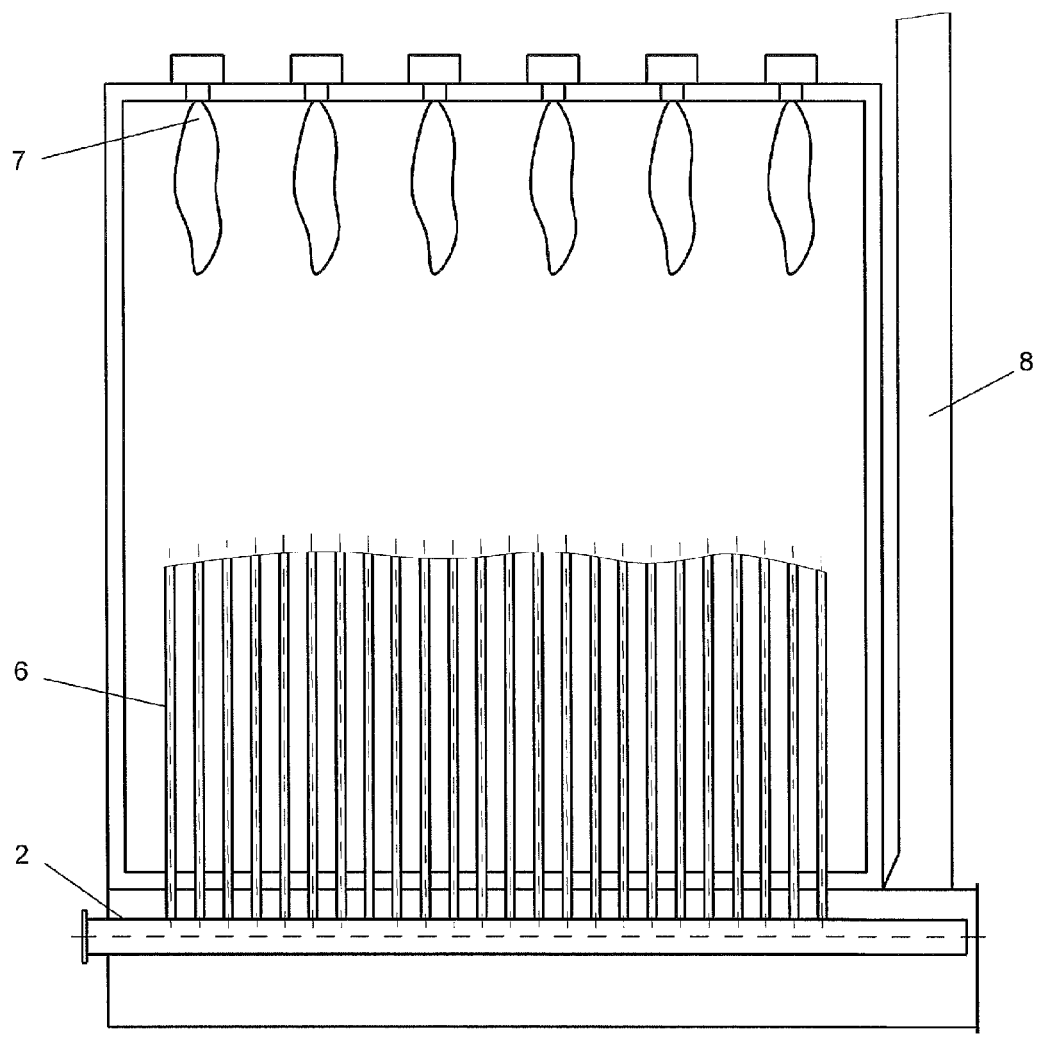

TRANSPORTABLE REFORMER

CROSS REFERENCE TO RELATED APPLICATIONS

This application is a U.S. National Stage Entry of International Patent Application Serial Number PCT/EP2012/005118, filed Dec. 12, 2012.

Field

The present invention relates to a transportable reformer for the catalytic reforming of hydrocarbons using steam at elevated pressure to produce synthesis gas. Such synthesis gas can be used, for instance, to produce ammonia, hydrogen and methanol, and the reformer is designed to enable transportation.

BACKGROUND

Reactors for the catalytic reforming of hydrocarbons using steam have been known for a long time and in a multitude of embodiments. For large-scale plants, one type has established itself, in which a top-fired box furnace with vertically arranged reaction tubes, or rather reformer tubes, is used. Here, the reformer tubes are arranged in rows. The feedstock flows through the catalyst-packed reformer tubes from top to bottom and, in so doing, is subjected to a so-called reforming process.

The gas outlet temperatures are normally 850° C. and above. The process gas leaving the reformer tubes is collected in manifolds, inside or outside the fired zone of the furnace. There are burners positioned in the "gaps" between the rows of tubes, said burners firing vertically downwards. The fired zone of the whole reformer is also called the furnace box. On average the temperatures in the furnace box range from 1000 to 1250° C. The furnace walls are provided with a protective refractory lining for heat insulation and for protection from the high temperatures that prevail due to heating.

The furnace box, in which the firing devices are located, has a number of brick tunnels at the bottom of the box for collecting the flue gases. These are basically arranged horizontally, in parallel and at right angles to the vertical tubes. The flue gas generated flows through the furnace box from top to bottom and is drawn off through these flue gas tunnels at the bottom which have openings at the sides.

DE 1 767 980 discloses a tube furnace for carrying out reforming reactions in the presence of catalysts, with vertically arranged tube layers consisting of individual tubes suspended elastically at their upper ends and joined to submanifolds at their lower ends, as well as top downfiring burners parallel to the tube layers, said aforementioned submanifolds resting on the hearth of the furnace as a support for the tubes and each submanifold being connected to a manifold externally of the furnace via a lateral outlet, said manifold resting on a support permitting sliding displacement transversely thereof and being connected to a discharge or transfer conduit supported by an elastic suspension means. In the above, the submanifolds correspond to the manifolds in the present invention, albeit the submanifolds are arranged within the furnace on its hearth. The smoke discharge flues—corresponding to flue gas tunnels—are partly inside the furnace and partly below the furnace.

One type of reformer is described, for example, in detail in WO 2010/149361 A2. Essentially, a reformer consists of a feed system for the feedstocks destined for reforming, a reformer tube and outlet manifold system and a firing zone with the equipment required for firing. With regard to the so-called "box form" of the reformer, separate foundations are required to support the firing zone and the manifolds and reformer tubes. For this reason, the reformer cannot be transported as is, as without specific action the manifolds do not, for example, have a fixed connection to the firing zone. Furthermore, bulky transport braces would be required for the self-supporting brick flue gas tunnels within the firing zone.

Due to its size the reformer has, until now, been assembled from prefabricated components direct at its final destination. This assembly is lengthy and requires considerable amounts of personnel and tools. At some destinations it is not unusual for completion of the plant to be delayed due to a lack of competent personnel.

SUMMARY

Therefore, the invention relates to the problem of providing a transportable reformer that is transported to the destination or place of operation in a manageable number of reformer parts, where it can be easily assembled to form a complete reformer, or is even transported ready-assembled to the destination from the place where it is put together or assembled.

BRIEF DESCRIPTION OF THE DRAWING

The present disclosure is described in detail below with reference to the attached drawing figures, wherein:

FIG. 2 is a side partial cross section view of an embodiment of a transportable reformer of the present disclosure.

DETAILED DESCRIPTION

Figure 1:
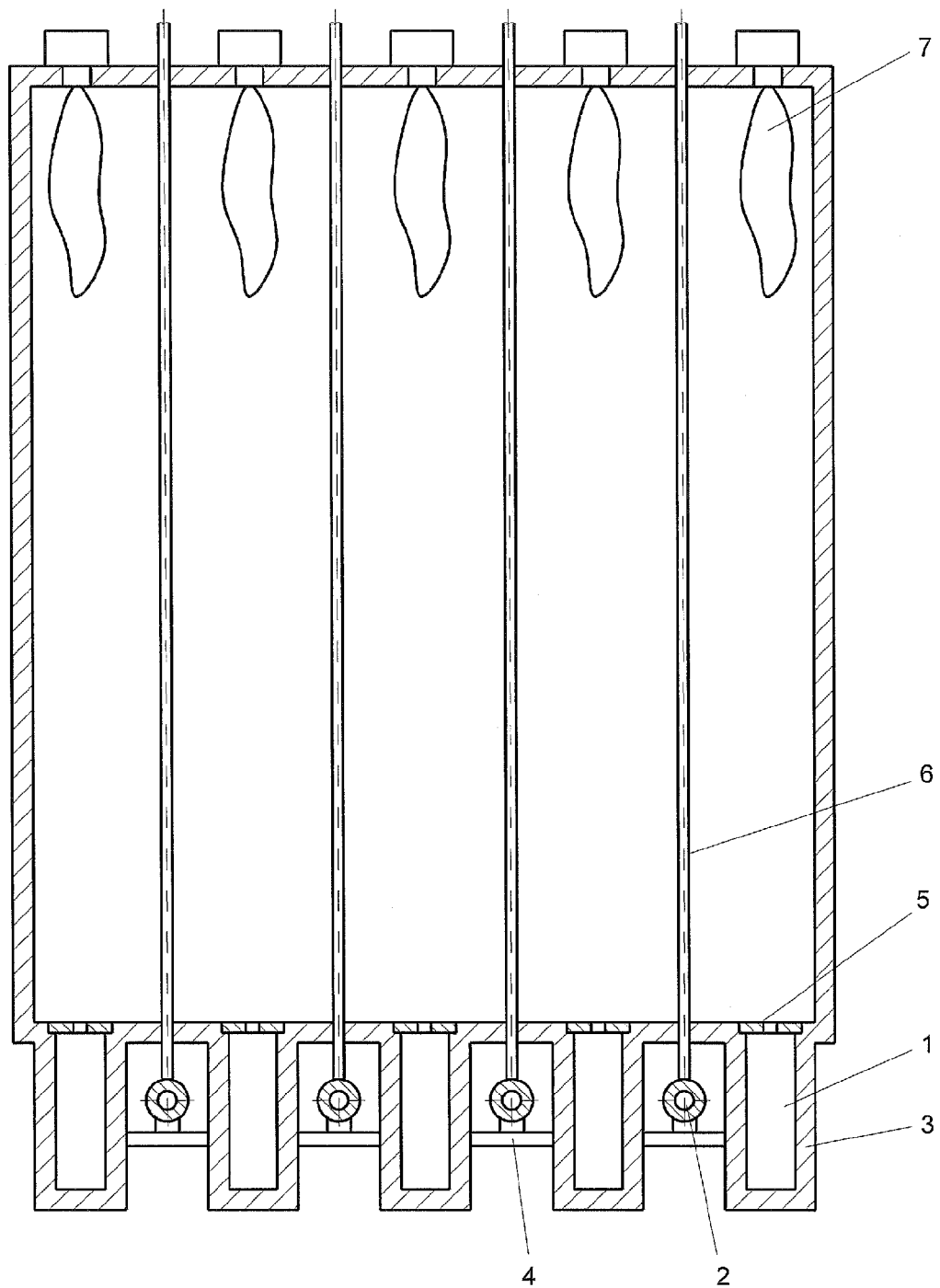
FIG. 1 is a front cross-sectional view of an embodiment of a transportable reformer of the present disclosure.

The objective is solved by a transportable reformer for the catalytic primary reforming of hydrocarbons using steam at elevated pressure, the transportable reformer having a reformer tube system and a firing zone, said reformer tube system comprising, as the reaction chamber, a plurality of vertical tubes that are arranged in rows and are suitable for being packed with catalyst, as well as devices for feeding the hydrocarbons to be reformed and steam to the reaction chamber, and comprising in the top part of the firing zone a plurality of firing devices arranged in parallel, said firing devices arranged in parallel being positioned between each of the reformer tubes and consisting of a plurality of burners arranged in rows, and said burners basically being able to generate flames that are directed downwards and which are suitable for heating the reformer tubes, as well as manifolds for discharging the reformed synthesis gas from the reaction chamber, said manifolds being outside the reaction chamber, and flue gas tunnels for discharging the flue gas generated in the firing zone, a plurality of said flue gas tunnels being arranged horizontally in parallel underneath the firing zone and said flue gas tunnels being arranged between each of the manifolds, said flue gas tunnels and the firing zone being firmly connected to each other, and said manifolds being connected to the flue gas tunnel in such a way that they are integrated with the rest of the reformer and so the ready-assembled reformer is designed as a transportable reformer.

In the prior art the flue gas tunnels are positioned inside the reaction chamber at the bottom in order to discharge the flue gases generated in the firing zone. The flue gas tunnels according to the invention are arranged horizontally, in parallel, outside and below the reaction chamber, between each of the manifolds. As the flue gas tunnels are positioned outside the reaction chamber, the flue gas tunnels can be firmly connected with the manifolds, reaction chamber and outer housing to form a system so that a reformer built according to this system is transportable.

The reformer can be pre-assembled to the point that it only needs to be transported from the place of assembly to the destination and fixed on a pre-prepared solid base or concrete columns.

If requested, the reformer can also be formed from a manageable number of interdependent parts on a modular basis, the interdependent parts being prefabricated so that they can be joined together at the place of assembly or so that the modules of interdependent parts are transported from the place of assembly to the destination and assembled at the destination. For example, the reformer can basically consist of an interdependent top and an interdependent bottom part, said top part basically comprising a feed system, reformer tube system and a firing zone, and the flue gas tunnels and manifolds being in the bottom part.

As a consequence of the flue gas tunnel arrangement according to the invention, the flue gas tunnels may be of various shapes, and the flue gas tunnels can thus have a U, V or a trapezoidal cross section.

The flue gas tunnel is positioned so that the openings are facing upwards in order that the flue gas generated in the reaction chamber can flow into the flue gas tunnel, the opening being covered by a cover slab provided with a flue gas inlet.

The flue gas inlets through the cover slabs into the flue gas tunnel are shaped as slots, holes, swirl inducers or gaps between the cover slabs.

So that the hot flue gas can flow through the flue gas tunnel, the flue gas tunnel has an inner and an outer wall, the inner wall of the flue gas tunnel being composed of a refractory lining and the outer wall of the flue gas tunnel of steel, with the inner wall and outer wall being firmly attached to each other.

Here, the outer wall is usually made of steel; the refractory lining of the inner wall may, for example, be constructed of stones, concrete, fibres or other refractory materials. Of course, the inner wall and the outer need to be interconnected in such a way that they can, in themselves, be transported. So that the reformer can be transported as a whole, the flue gas tunnels are, for example, connected to the bottom of the firing zone and the manifolds, on the other hand, to the flue gas tunnels or the bottom of the firing zone. Below the manifolds there are fasteners and supports at predefined intervals across the entire length to support said manifolds. These fasteners and supports may be of various constructional designs.

At the same time, the fasteners or supports of the manifolds are each arranged on a separate girder which in each case connects two flue gas tunnels at the outer walls so that the loads of the reformer tube system are passed into the outer walls of the flue gas tunnels.

The manifold supports can each be arranged vertically on a separate girder, each of said girders horizontally connecting two flue gas tunnels at the outer walls so that the loads of the reformer tube system are passed into the outer walls of the flue gas tunnels. In a first step, the reformer tube system is thus firmly connected to the furnace box. The arrangement of the supports on the girders can be designed in the shape of an equal-sided trapezoid as with this variant equal stability and load distribution is also achieved.

Attaching the manifolds to the rest of the reformer as above constitutes only one variant. The fasteners or supports of the manifolds can also be designed differently as long as the same effect is achieved. For example, the manifolds can also be attached via a pipe hanger construction at the bottom of the furnace box.

As the fully assembled reformer is fixed to a pre-prepared spot at the destination, usually with fixed sturdy concrete columns, there is a specific pre-determined distance between the floor and the manifolds. This also results in the manifolds being cooled naturally. In order to ensure the manifolds are thus cooled in any event, a warm-air stack is provided so that one end of each gap between two flue gas tunnels is connected to a separate or common warm-air stack, the natural draught of which guarantees a constant supply of fresh air in the gaps.

FIG. 1 and FIG. 2 illustrate the design of the flue gas tunnel and the manifolds of the transportable reformer according to the invention.

The fully assembled reformer can be transported as a whole. The reaction chamber basically comprising the reformer tube system and firing devices is only shown in a simplified way here.

FIG. 1 shows a plurality of flue gas tunnels (1) and manifolds (2) arranged horizontally in parallel below the firing zone, said flue gas tunnels (1) being positioned between each of the manifolds (2). The depth of the flue gas tunnels can be between 2 m and 3 m, preferably 2.5 m, the width of the flue gas tunnels is between 0.5 m and 0.8 m, and the refractory lining (3) of the flue gas tunnel (1) is approximately 0.2 m to 0.35 m. The diameter of the manifolds (2) including the refractory lining is between 0.5 m and 0.66 m. In some examples, such as that shown in FIG. 1 for instance, all of the plurality of flue gas tunnels (1) of the transportable reformer are disposed below the firing zone of the furnace and/or beneath the bottom of the furnace for the reasons set forth above. In other words, in some cases none of the plurality of flue gas tunnels (1) are disposed in the firing zone of the furnace or above the bottom of the furnace, as can be seen in FIG. 1, for example.

In addition to the firing device (7), process gas tubes (6) and manifold (2), FIG. 2 also shows a warm-air stack (8) so that a constant supply of fresh air between the manifolds is guaranteed.

LIST OF REFERENCE NUMBERS AND DESIGNATIONS

1 Flue gas tunnel
2 Manifold
3 Refractory lining
4 Girder
5 Cover slab
6 Process gas tube
7 Firing device
8 Warm-air stack

What is claimed is:
1. A transportable reformer for the catalytic primary reforming of hydrocarbons using steam at elevated pressure, comprising:
a reformer tube system having, a plurality of vertical reformer tubes arranged in rows and configured to be packed with catalyst and function as reaction chambers, and a plurality of feeders in communication with the reformer tubes and configured to feed hydrocarbons to be reformed and steam to the reformer tubes;

a furnace having a firing zone disposed about the reformer tube system, a top part, and a bottom part, the top part including a plurality of burners arranged in parallel rows disposed between each of the rows of reformer tubes and configured to generate downward directed flames suitable to heat the plurality of vertical reformer tubes;

a plurality of manifolds in communication with the reformer tubes and disposed beneath the firing zone of said furnace and beneath a bottom of the furnace, said manifolds configured to discharge reformed synthesis gas from said reformer tube system;

a plurality of horizontal parallel flue gas tunnels disposed below and in gaseous communication with the firing zone of said furnace and beneath the bottom of the furnace, each of said flue gas tunnels further being structurally coupled to a body of said furnace, said flue gas tunnels being configured to discharge flue gas generated in the firing zone of said furnace, wherein all flue gas tunnels of the transportable reformer are disposed below the firing zone of the furnace and beneath the bottom of the furnace.

2. The transportable reformer of claim 1, wherein the reformer is a modular unit comprised of a plurality of interdependent components.

3. The transportable reformer of claim 2, wherein the interdependent components are prefabricated so that they can be joined together at an assembly facility.

4. The transportable reformer of claim 1, wherein said flue gas tunnels have a U-shaped cross section.

5. The transportable reformer of claim 1, wherein said flue gas tunnels have a V-shaped cross section.

6. The transportable reformer of claim 1, wherein said flue gas tunnels have a trapezoidal-shaped cross section.

7. The transportable reformer of claim 1, wherein said flue gas tunnels each include an upward-facing opening defined in a top portion thereof, said opening being covered by a cover slab having at least one flue gas inlet aperture defined therein to permit flue to pass from said furnace into said flue gas tunnels.

8. The transportable reformer of claim 1, wherein an inner wall of each of said flue gas tunnels is made of a refractory lining and an outer wall of said flue gas tunnels is made of steel, with the inner wall and outer wall being firmly affixed to each other.

9. The transportable reformer of claim 1, wherein said flue gas tunnels are connected to the bottom part of said furnace.

10. The transportable reformer of claim 1, wherein a plurality of fasteners and supports are disposed below said manifolds at predefined intervals across an entire length of said manifolds so as to support said manifolds, wherein the plurality of fasteners and supports are affixed to a plurality of girders, wherein each of the girders is connected to and disposed between opposing outer walls of two adjacent flue gas tunnels, so that vertical loads from the reformer tube system are transferred to and supported by the outer walls of said flue gas tunnels.

11. The transportable reformer of claim 1, further comprising:

a warm-air stack in gaseous communication with said plurality of manifolds and with a source of cool air for cooling said plurality of manifolds by way of a natural draught during operation of the transportable reformer that draws in the cool air.

12. The transportable reformer of claim 11, wherein each of a consecutive pair of flue gas tunnels defines a channel disposed there between, and wherein an open end of each channel is in gaseous communication with said warm-air stack, the natural draught of which warm-air stack is configured to draw in a constant supply of cool air and convey the cool air into each of the channels to cool said plurality of manifolds.

13. The transportable reformer of claim 1 wherein each of the plurality of manifolds is integrally coupled to each of an adjacent pair of the flue gas tunnels.

14. The transportable reformer of claim 1 wherein each of the plurality of manifolds is disposed between each of an adjacent pair of the flue gas tunnels.

15. The transportable reformer of claim 1 wherein the transportable reformer is configured to be selectively transportable as a single unit without needing temporary support structures.

16. The transportable reformer of claim 1 wherein at least one of the plurality of manifolds is integrally coupled to at least one of the flue gas tunnels.

17. The transportable reformer of claim 1 wherein at least part of a wall of each of the plurality of horizontal parallel flue gas tunnels is comprised of steel.

18. The transportable reformer of claim 1 wherein the plurality of horizontal parallel flue gas tunnels are firmly connected to the plurality of manifolds below the firing zone of the furnace and beneath the bottom of the furnace.

19. A transportable reformer for the catalytic primary reforming of hydrocarbons using steam at elevated pressure, the transportable reformer comprising:

a reformer tube system including
a plurality of reformer tubes configured to be packed with catalyst and function as reaction chambers, and
a plurality of feeders in communication with the plurality of reformer tubes and configured to feed hydrocarbons to be reformed and steam to the plurality of reformer tubes;

a furnace including a firing zone disposed about the reformer tube system, the furnace further comprising a plurality of burners configured to generate downward directed flames suitable to heat the plurality of reformer tubes;

a plurality of manifolds in communication with the plurality of reformer tubes and disposed beneath the firing zone of the furnace and beneath a bottom of the furnace, the plurality of manifolds configured to discharge reformed synthesis gas from the reformer tube system;

a plurality of flue gas tunnels disposed below and in gaseous communication with the firing zone of the furnace and beneath the bottom of the furnace, each of the plurality of flue gas tunnels being structurally coupled to a body of the furnace, the plurality of flue gas tunnels being configured to discharge flue gas generated in the firing zone of the furnace, wherein all flue gas tunnels of the transportable reformer are disposed below the firing zone of the furnace and beneath the bottom of the furnace.

20. The transportable reformer of claim 19 wherein at least part of a wall of each of the plurality of horizontal parallel flue gas tunnels is comprised of steel.

* * * * *